(12) United States Patent
Niu et al.

(10) Patent No.: US 10,049,717 B2
(45) Date of Patent: Aug. 14, 2018

(54) WEAR LEVELING FOR STORAGE OR MEMORY DEVICE

(71) Applicant: SAMSUNG ELECTRONICS CO., LTD., Suwon-Si, Gyeonggi-do (KR)

(72) Inventors: Dimin Niu, Sunnyvale, CA (US); Mu-Tien Chang, Santa Clara, CA (US); Hongzhong Zheng, Los Gatos, CA (US); Kyung-Chang Ryoo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 15/169,590

(22) Filed: May 31, 2016

(65) Prior Publication Data

US 2017/0256305 A1 Sep. 7, 2017

Related U.S. Application Data

(60) Provisional application No. 62/303,354, filed on Mar. 3, 2016.

(51) Int. Cl.
| | |
|---|---|
| *G06F 12/00* | (2006.01) |
| *G11C 11/406* | (2006.01) |
| *G06F 12/02* | (2006.01) |
| *G11C 14/00* | (2006.01) |

(52) U.S. Cl.
CPC ...... *G11C 11/40618* (2013.01); *G06F 12/023* (2013.01); *G11C 14/00* (2013.01); *G06F 2212/1044* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 8,713,330 B1 | 4/2014 | Sommer et al. | |
| 8,745,357 B2 | 6/2014 | Tucek et al. | |
| 9,009,565 B1 | 4/2015 | Northcott et al. | |
| 9,158,672 B1 | 10/2015 | Zheng et al. | |
| 2008/0152142 A1* | 6/2008 | Buer | G06F 12/1408 380/270 |
| 2010/0281202 A1* | 11/2010 | Abali | G06F 12/0246 711/103 |
| 2015/0234612 A1 | 8/2015 | Himelstein et al. | |

* cited by examiner

*Primary Examiner* — Midys Rojas
(74) *Attorney, Agent, or Firm* — Lewis Roca Rothgerber Christie LLP

(57) ABSTRACT

A method of wear leveling for a storage device or a memory device includes: receiving an inputted memory address; randomizing the inputted memory address to be a randomized memory address; and periodically reassigning the randomized memory address to be a different memory address.

14 Claims, 3 Drawing Sheets

WEAR LEVELING FOR STORAGE OR MEMORY DEVICE

CROSS-REFERENCE TO RELATED APPLICATION

This utility patent application claims priority to and the benefit of U.S. Provisional Patent Application Ser. No. 62/303,354, filed Mar. 3, 2016, entitled "SIMPLIFIED WEAR LEVELING FOR ENDURANCE-LIMITED MEMORY/STORAGE DEVICES," the entire content of which is incorporated herein by reference.

BACKGROUND

1. Field

Aspects of example embodiments of the present invention relate to a wear leveling method for a storage device or a memory device, such as for an endurance-limited storage device or memory device, a storage device employing the wear leveling method, and a memory device employing the wear leveling method.

2. Related Art

Recently, demand for high-capacity, high-performance storage and memory devices has increased. For example, creation and consumption of digital content, such as high-definition video files and the like, has placed high demand on existing storage devices for enterprise users and the general population. In addition, access times of the storage devices have become a bottleneck in modern electronics.

Compared to traditional non-volatile storage devices, such as hard disk drives (HDDs) and tape drives (often referred to as magnetic storage devices), recently-developed non-volatile storage devices have significantly improved access times. Such non-volatile storage devices include flash memory devices, phase-change random access memory (PRAM), spin-transfer torque random access memory (STT-RAM), and resistive random access memory (ReRAM) (often referred to as solid-state devices or solid-state storage devices).

However, some solid-state storage devices have reduced write endurance compared to the traditional, mechanical storage devices. Write endurance generally refers to the number of updates (e.g., write, rewrite, and/or erase cycles) a memory chip or block can endure before becoming compromised. When a memory chip or block becomes compromised due to, for example, over-use, the memory chip or block may no longer reliably store information (e.g., a bit value, such as 1 or 0). As the number of compromised memory chips or blocks in a storage device increases, the storage device may be more susceptible to data corruption and/or an amount of available storage may be reduced due to the compromised memory chips or blocks.

While mechanical storage devices, such as HDDs, have very high write endurance, some solid-state storage devices may have relatively limited write endurance. For example, flash memory storage devices may have a write endurance of approximately $10^3$ to $10^5$ writes, PRAM may have a write endurance of approximately $10^6$-$10^8$ writes, STT-RAM may have a write endurance of approximately $10^{12}$ writes, and ReRAM may have a write endurance of approximately $10^8$-$10^{10}$ writes. Accordingly, as utilization of storage devices increases due to, for example, the proliferation of large digital files, such as high-definition videos and the like, the possibility of these recently-developed storage devices rapidly reaching their write endurance limits is becoming increasingly likely. Furthermore, solid-state storage devices are more susceptible to malicious code attacks. As one example, a malicious code attack on a flash memory storage device could render the device unusable due to reaching its write endurance in approximately 60 days.

To extend the lifespan of such non-volatile storage devices, wear leveling processes or methods are often employed to spread writes across all or substantially all of the available memory blocks. Wear leveling processes or methods generally monitor use of memory chips or blocks in the storage device and distribute incoming writes and rewrites to relatively lightly used blocks in the storage device. Thus, rather than all of the writes and rewrites being repeatedly performed on a few memory blocks while other memory blocks remain unused or lightly used, which would cause the repeatedly used memory blocks to quickly expire and limiting a storage capacity of the storage device, wear leveling processes or methods spread the writes and rewrites across all or substantially all of the available blocks to extend the lifespan of the memory device. Accordingly, the lifespan of the storage device is extended as all or substantially all of the memory blocks are evenly used or utilized by preventing a small number of the available memory blocks from rapidly reaching their write endurance limits and becoming unusable.

SUMMARY

The present disclosure is directed toward various embodiments of a wear leveling method for a storage device or a memory device, such as an endurance-limited storage device or memory device, and a storage device or a memory device employing the wear leveling method. In one example embodiment, the wear leveling method includes a plurality of levels (e.g., is a multi-level wear leveling method) to provide a simplified wear leveling and attack prevention method.

According to one embodiment, a method of wear leveling for a storage device or a memory device includes: receiving an inputted memory address; randomizing the inputted memory address to be a randomized memory address; and periodically reassigning the randomized memory address to be a different memory address.

The randomizing of the inputted memory address may include swizzling the inputted memory address to be a swizzled memory address.

The randomizing of the inputted memory address may further include applying an XOR function to the swizzled memory address.

The XOR function may use a fixed key.

The swizzling of the inputted memory address may include variable address swizzling, fixed address swizzling, or partially variable address swizzling.

The periodically reassigning of the randomized memory address may include global or local rotation of the randomized memory address.

The global or local rotation of the randomized memory address may include start-gap wear leveling or security refresh.

The periodically reassigning of the randomized memory address may occur based on a number of writes.

According to another embodiment, a method of wear leveling for a storage device or a memory device including a plurality of memory cells includes: receiving a logical block address from a host; randomizing the logical block address to be a randomized memory address; and periodically reassigning the randomized memory address to provide a physical block address of one of the memory cells.

The randomizing of the logical block address may include swizzling the received logical block address.

The randomizing of the logical block address may further include applying an XOR function to the swizzled logical block address.

The XOR function may use a fixed key.

The swizzling of the received logical block address may include variable address swizzling, fixed address swizzling, or partially variable address swizzling.

According to another embodiment, a storage device includes: a controller; and a plurality of memory devices. The controller is configured to randomize an inputted memory address and is further configured to periodically reassign the randomized memory address according to a number of writes to the plurality of memory devices.

The randomizing of the inputted memory address may include swizzling the inputted memory address.

The swizzling of the inputted memory address may include variable address swizzling, fixed address swizzling, or partially variable address swizzling.

The controller may be further configured to apply an XOR function to the swizzled memory address before periodically reassigning the swizzled memory address.

The XOR function may use a fixed key.

The periodically reassigning of the randomized memory address may include global or local rotation of the randomized memory address.

The global or local rotation of the randomized memory address may include start-gap wear leveling or security refresh.

This summary is provided to introduce a selection of features and concepts of example embodiments of the present disclosure that are further described below in the detailed description. This summary is not intended to identify key or essential features of the claimed subject matter nor is it intended to be used in limiting the scope of the claimed subject matter. One or more of the described features according to one or more example embodiments may be combined with one or more other described features according to one or more exemplary embodiments to provide a workable device.

DETAILED DESCRIPTION

Figure 1:
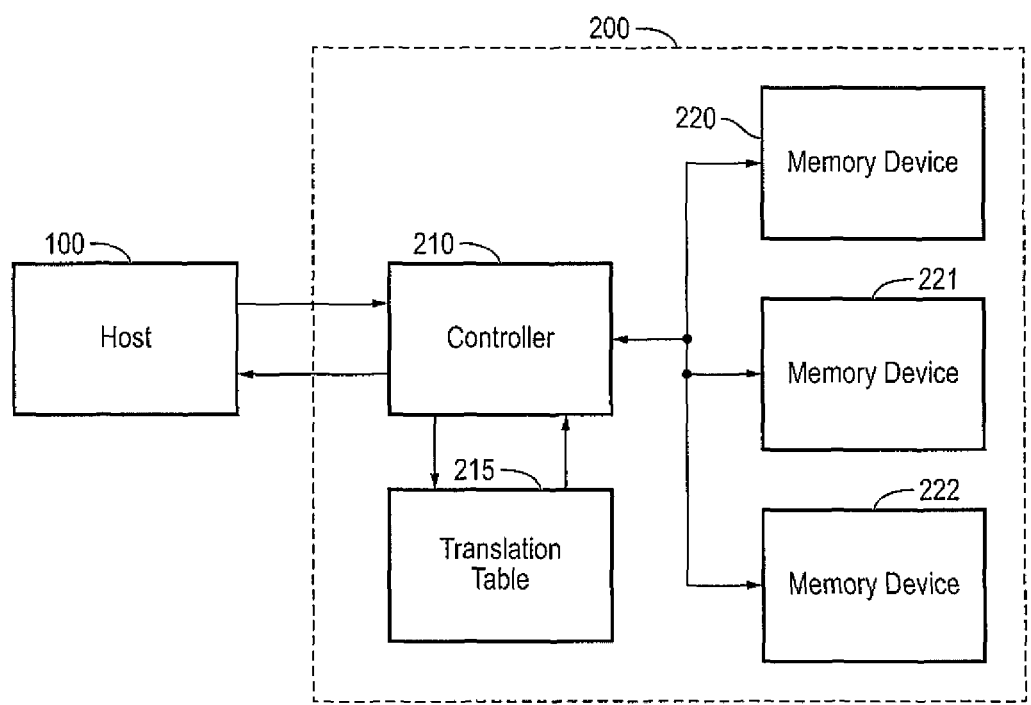
FIG. 1 is a schematic diagram of a storage device and a host according to one or more embodiments.

The present disclosure is directed toward various example embodiments of a wear leveling method including a plurality of levels (e.g., a multi-level wear leveling method). In one example embodiment, a wear leveling method includes a global address scrambler and a global and/or local rotation module to provide wear leveling and attack resistance or prevention for a storage device or a memory device, such as an endurance-limited storage device or memory device. In other embodiments, a storage device and a memory device are provided which employs the wear leveling method. Accordingly, a simplified wear leveling method can be implemented in a storage device (or a memory device) that also provides attack resistance or prevention, thereby securing the data on the storage device while extending a useful lifespan of the storage device.

Throughout this specification, references may be made to embodiments for or including a storage device or a memory device. However, the features described as being available to an embodiment for or including a storage device should be considered as being similarly available for an embodiment for or including a memory device and vice versa. Furthermore, as used herein, the term "storage device" includes any and all devices for storing data or information, such as, for example, memory chips, memory modules, memory devices, and/or the like.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element is referred to as being "on," "connected to," or "coupled to" another element, it can be directly on, connected to, or coupled to the other element, or one or more intervening elements may be present. In addition, it will also be understood that when an element is referred to as being "between" two elements, it can be the only element between the two elements, or one or more intervening elements may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The controller and/or any other relevant devices or components according to example embodiments of the present invention described herein may be implemented utilizing any suitable hardware, firmware (e.g., an application-specific integrated circuit), software, and/or a suitable combination of software, firmware, and hardware. For example, the various components of the controller may be formed on one integrated circuit (IC) chip or on separate IC chips. Further, the various components of the controller may be implemented on a flexible printed circuit film, a tape carrier package (TCP), a printed circuit board (PCB), or formed on a same substrate as the controller. Further, the various components of the controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the example embodiments of the present invention.

As discussed above, non-volatile devices (e.g., non-volatile memory devices, such as solid-state storage devices) have been recently developed which have significantly improved access times over traditional, mechanical storage devices and improved cost-per-bit over traditional dynamic random access memory (DRAM). Such recently-developed devices include flash memory devices, PRAM devices, STT-RAM devices, and ReRAM devices, among others.

These recently-developed storage devices generally include a plurality of blocks or chips (e.g., memory blocks or memory chips) and a controller for controlling (updating) the blocks or chips (e.g., for handling writes, rewrites, and erases to the blocks or chips) Each block or chip may include a plurality of memory cells. The individual memory cells are controlled to be in one of two states, such as a charged and an uncharged state. These different states can be interpreted by the controller or by another component as being a digital one or zero. As such, a plurality of these memory cells can together store a digital file in the form of a plurality of ones and zeros, which can be interpreted by the controller or other component as the stored digital file.

The memory blocks or chips in, for example, flash memory devices are semiconductor integrated circuit chips and include the plurality of memory cells. The memory cells are arranged in a grid on the chip. Accordingly, the memory cells can be addressed based on their position on the chip and based on which chip from among the various chips of the storage device they are arranged on.

FIG. 1 is a schematic diagram of a storage device 200 (e.g., a memory device) and a host 100 according to one or more embodiments. In FIG. 1, the host 100 is illustrated as being separate from (e.g., external to) the storage device 200. However, the present invention is not limited thereto, and in other embodiments, the host may be in the storage device.

As can be seen in FIG. 1, the host 100 is configured to bi-directionally communicate with the storage device 200, for example, to bi-directionally communicate with a controller 210 in the storage device 200. In one example embodiment, the host 100 may be a central processing unit (CPU); however, the present invention is not limited thereto.

The host 100 communicates with the controller 210 and directs the controller 210 to store, retrieve, and/or erase data to or from the storage device 200, for example, to or from various memory devices 220-222 in the storage device 200. The memory devices 220-222 may be, in one example embodiment, flash memory chips.

A position of an individual memory cell in the memory devices 220-222 may be referred to by a physical block address (PBA). The form of the PBA may be device specific (e.g., storage device specific). The host 100, however, may rely on logical block addresses (LBA) to interact with the storage device 200 rather than the physical block addresses because the physical block addresses may vary between different storage devices. Logical block addresses are generally sequentially numbered memory locations which are available to (are visible to or are used by) the host 100.

Figure 2:
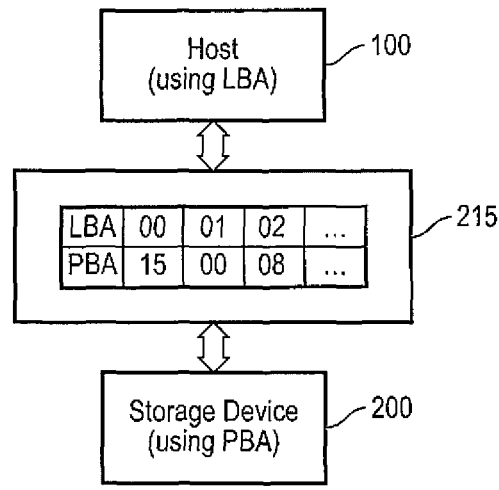
FIG. 2 is a block diagram illustrating host/storage device communication of the storage device and the host illustrated in FIG. 1.

For example, as illustrated in FIGS. 1 and 2, the host 100 may command that certain data be stored at logical block addresses 00, 01, and 02, and the storage device 200 (e.g., the controller 210) may store the commanded data at physical block addresses 15, 00, and 08, respectively. Thus, the logical block addresses commanded may be different from (e.g., may not have any correlation to) the physical block addresses where the data is stored. However, use of the logical block addresses provides the host 100 a simplified method of communicating with the storage device 200.

Generally, the LBA to PBA conversation may also include wear leveling aspects. For example, the controller 210 may determine which cell(s) or group(s) should be written to according to various characteristics, such as total number of updates to the cell(s) and/or group(s).

One wear leveling method is table-based wear leveling. According to one or more example embodiments, in table-based wear leveling, a translation table 215 is maintained in (e.g., stored and updated in), for example, the controller 210. Although in FIGS. 1 and 2 the translation table 215 is shown outside of the controller 210, this is for convenience of illustration, and the translation table 215 is maintained in the controller 210 in the storage device 200 according to one or more example embodiments. For example, in one embodiment of a memory device, the controller 210 and the translation table 215 may be implemented in a chip (e.g., a dedicated chip) of the memory device. The translation table 215 tracks the correlation between the stored data's logical block address (LBA) and the data's physical block address (PBA), which may periodically change to enable wear leveling of the memory devices 220-222. The table-based wear leveling method is generally effective at wear leveling as each individual cell is tracked; however, this method also uses substantial non-volatile memory overhead to store the translation table 215. For example, depending on a memory capacity and a block size of the storage device, the table-based wear leveling may have 7-15% memory overhead to maintain the translation table (e.g., 7-15% of the storage capacity of the storage device 200 may need to be devoted to storing the translation table). Even further, the translation table 215 may need to be moved from non-volatile memory into faster memory, such as volatile random access memory, during startup to ensure it can be quickly accessed and updated. In this case, any unexpected power outage could cause data loss to the translation table if it is not written back to the non-volatile memory prior to the power loss.

Figure 3:
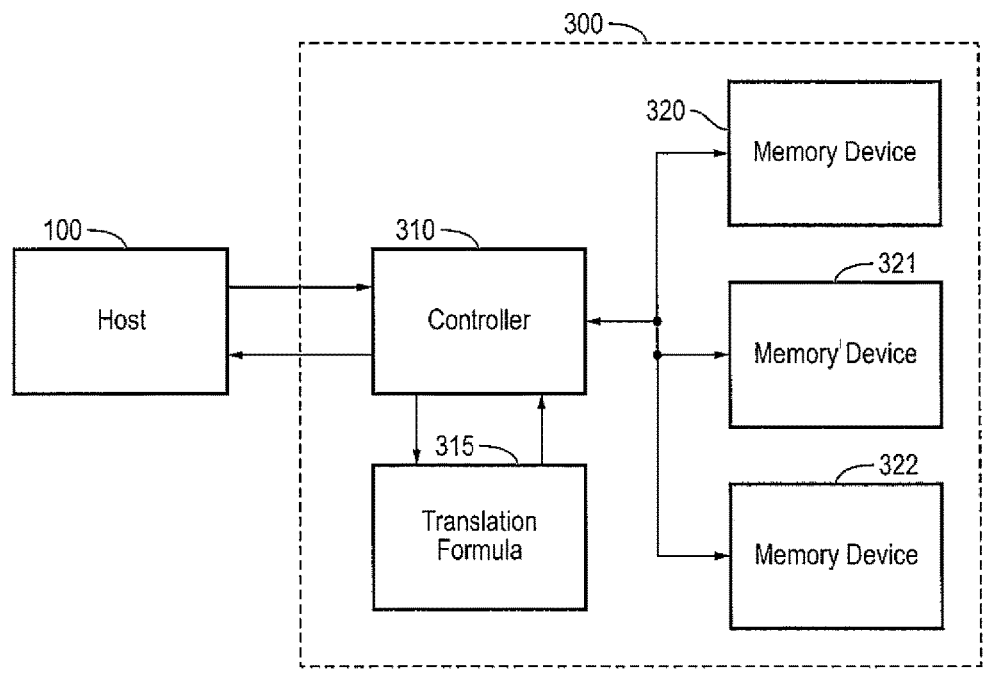
FIG. 3 is a schematic diagram of a storage device and a host according to one or more embodiments.

Another wear leveling method is address calculation-based wear leveling. As can be seen in FIG. 3, which illustrates a similar host 100 and storage device 300 as that described above with respect to FIG. 1, in address calculation-based wear leveling, logical-to-physical block address information (LBA to PBA information) is dynamically generated using a translation formula 315 that is maintained in (e.g., stored and updated in), for example, the controller 310. Although the translation formula 315 is illustrated as being outside of the controller 310 in FIG. 3, this is for convenience of illustration, and the translation formula 315 is maintained in the controller 310 in the storage device 300 according to one or more embodiments. The translation formula 315 may be periodically changed to enable wear leveling of the memory devices 320-322. In the address calculation-based wear leveling, as an example, a commanded write to logical block address 00 will be written to physical block address 59 under translation formula A, but a commanded write to logical block address 00 will be written to physical block address 23 under translation formula B.

Different from the table-based wear leveling described above with reference to FIGS. 1 and 2, the address calculation-based wear leveling has smaller overhead due to the translation formula 315 taking the place of the translation table 215. Thus, rather than storing and/or updating the translation table 215, which includes information regarding each cell in the memory devices, the translation formula 315 is a formula which can be applied to determine the physical block address of any logical block address. However, the address calculation-based wear leveling may not be as effective as the table-based wear leveling as there is no cell-by-cell control of writes, rewrites, and/or erase cycles. Furthermore, the address calculation-based wear leveling is more susceptible to malicious code attacks than address table-based wear leveling as the logical-to-physical block address conversations are not optimal. Two examples of address calculation-based wear leveling are start-gap wear leveling and security refresh.

According to example embodiments of the present invention, a multi-level wear leveling method includes a two-step randomization method (e.g., a two-step global address scrambler) to hide mapping information between logical block addresses and physical block addresses of a storage device followed by global and/or local rotation or reassignment of addresses within the storage device.

Figure 4:
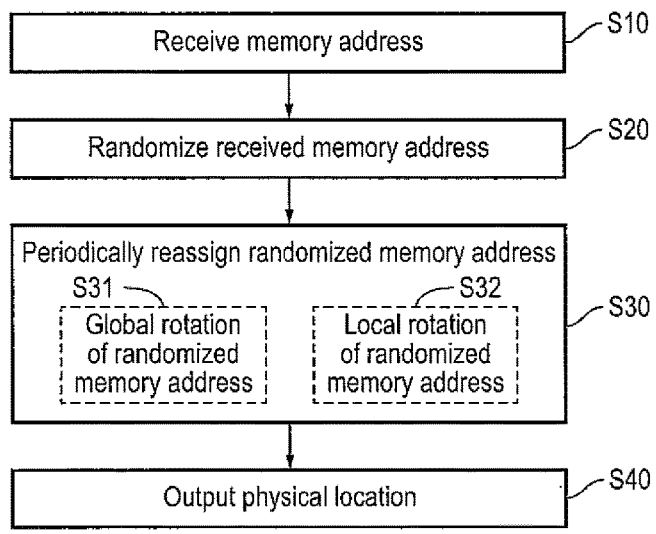
FIG. 4 is a flow chart illustrating a wear leveling method according to one or more embodiments.

According to one or more example embodiments of the present invention, as illustrated in FIG. 4, a memory address (e.g., a logical block address) is received by a controller (S10), such as the controller 310 illustrated in FIG. 3, and the memory address may be received from the host 100.

Figure 5:
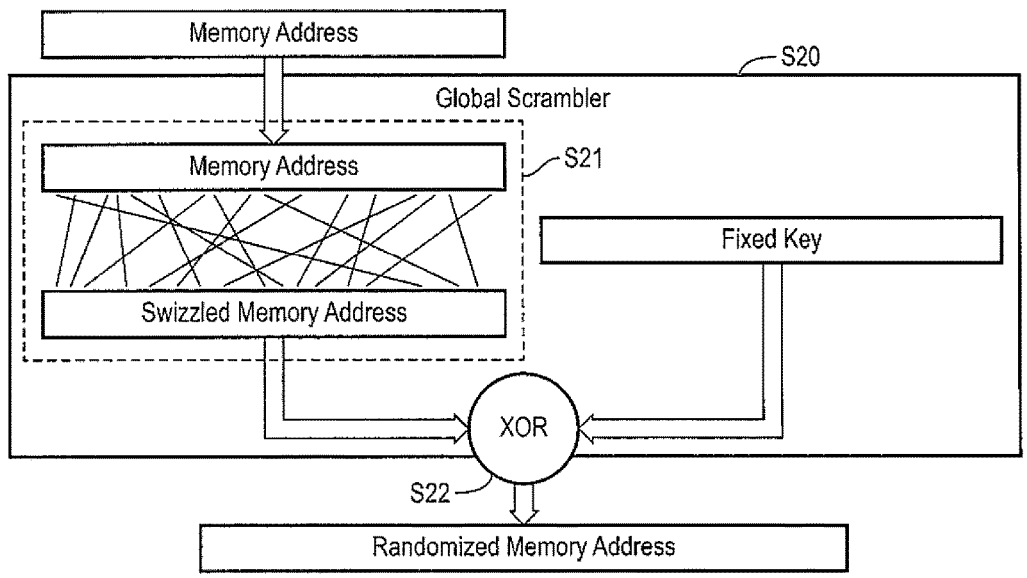
FIG. 5 is a diagram illustrating a step of randomizing a received memory address of the wear leveling method illustrated in FIG. 4.

Then, the received memory address (e.g., the inputted memory address) is randomized (S20). In one or more embodiments, the received memory address may be randomized by, for example, a global scrambler (e.g., a global scrambler module) as illustrated in FIG. 5. The global scrambler may be included in (or may be performed by) a controller of a storage device, such as in the controller 310 illustrated in FIG. 3.

The randomizing of the received memory address (S20) may include, according to one or more example embodiments, row address swizzling (S21 illustrated in FIG. 5) followed by an XOR function (e.g., an exclusive OR function) with a key (e.g., with a fixed key) (S22 illustrated in FIG. 5). By randomizing the received memory address (S20), the physical block addresses (PBA) (e.g., the physical locations) of memory cells of memory chips in the storage device are hidden (e.g., are randomized), preventing attackers from being able to identify logical block addresses of adjacent memory cells. And, as will be further described below, the row address swizzling (S21) maintains a 1-to-1 address mapping from logical block addresses to physical block addresses.

Swizzling is generally a process through which an input (e.g., an inputted value) is shifted, rotated, or mixed (e.g., shifted, rotated, or mixed according to a specified pattern). For example, an inputted value or values may be shifted or changed by swizzling to be a different output while maintaining 1-to-1 correspondence between input and output values.

According to one example embodiment, the row address swizzling (S21) is variable address swizzling. When the row address swizzling is the variable address swizzling, the swizzling function is randomly implemented (e.g., the swizzling function is randomly generated and stored to the controller of the storage device) during the manufacture of the storage device. Furthermore, different storage devices manufactured together may be differently swizzled (e.g., different swizzle functions may be implemented to each manufactured storage device). The variable address swizzling is relatively secure due to the random implementation but uses additional manufacturing overhead to provide a randomized swizzle to each storage device during manufacture.

According to one or more example embodiments, the row address swizzling (S21) is fixed address swizzling. When the row address swizzling is the fixed address swizzling, all manufactured storage devices have the same address swizzling (e.g., one swizzling function is generated during manufacturing and stored to the controller of each of a number of manufactured storage devices), different from the above-described variable address swizzling. Thus, this method uses less manufacturing overhead than the variable address swizzling but may typically be less secure due to the same swizzling function being applied to numerous storage devices.

According to one or more example embodiments, the row address swizzling (S21) is partial variable address swizzling (or partially variable address swizzling). When the row address swizzling is the partial variable address swizzling, only some of the address bits are (e.g., only a part of the address bits is) randomly swizzled during manufacture while the remaining address bits are (e.g., the other part of the address bits is) not randomized (e.g., the swizzling function is partially-randomly generated during manufacturing and is stored to the controller of the storage device). In one embodiment, only lower address bits are randomly swizzled during manufacture while higher address bits are not randomized. Thus, this method uses more manufacturing overhead than the fixed address swizzling but less manufacturing overhead than the variable address swizzling and is typically more secure than the fixed address swizzling but is typically less secure than the variable address swizzling.

After the received memory address (e.g., the logical block address) is swizzled (S21), as described above, the swizzled memory address is subjected to the XOR function using the key (e.g., the fixed key) (S22). The fixed key may be provided to the storage device during manufacture and/or may be provided during disk formatting.

After being subjected to the XOR function (S22), the swizzled memory address is a randomized memory address which is stored in the storage device (e.g., which is stored in a controller of the storage device).

By randomizing the received memory addresses by using the two-step randomization method described above (S20) according to example embodiments of the present invention, adjacent logical block addresses become discrete and the physical location of memory cells are hidden from the host. Thus, attackers cannot easily identify the logical block addresses of adjacent memory cells.

Then, the randomized memory address is periodically reassigned (S30) at runtime to be a different memory address. For example, the randomized memory address may be globally rotated (S31 illustrated in FIG. 6) and/or locally rotated (S32 illustrated in FIG. 6). Any known global and/or local rotation method(s) may be used, such as the start-gap wear leveling and the security refresh methods. Global rotation refers to the rotation or reassignment of pages (e.g., entire pages) within a bank (e.g., referring to FIG. 6, the rotation of one or more Local Groups 1, 2, . . . , n within one or more Banks 0-2 of a storage device), while local rotation refers to the rotation or reassignment of pages at a finer granularity, such as within each group (e.g., referring to FIG. 6, the rotation of pages within one or more of the Groups 1, 2, . . . , n within one or more of the Banks 0-2 of the storage device).

Figure 6:
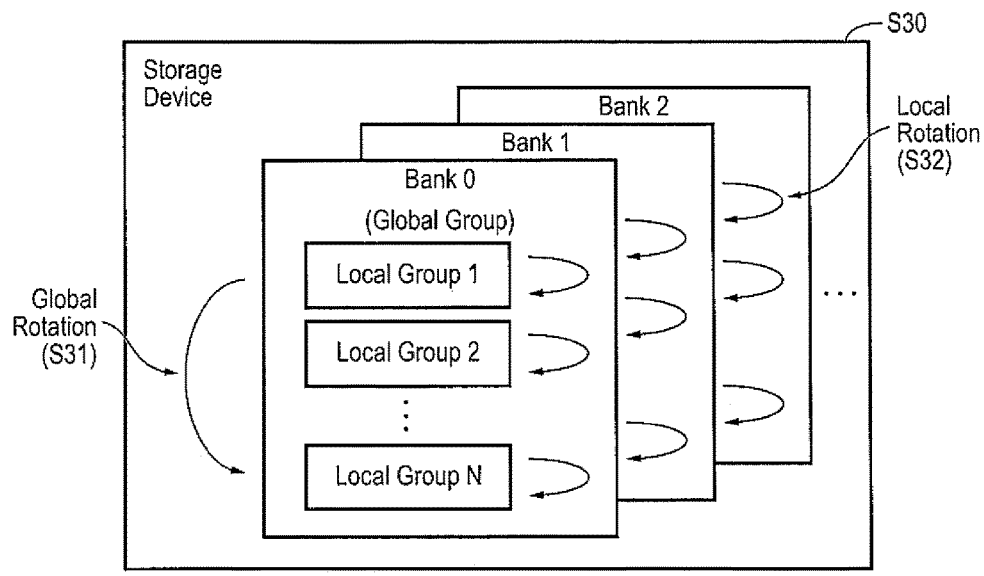
FIG. 6 is a schematic diagram illustrating one or more steps of the wear leveling method illustrated in FIG. 4.

Referring to FIG. 6, the global and/or local rotation method(s) will move one or more (e.g., a fixed number of) memory cells within a group (e.g., will write to a different memory cell within the group) after a certain number of writes to the group. In some embodiments, remapping algorithms of the global and/or local rotation methods) are not dynamically changed.

In one example embodiment, the start-gap wear leveling may be employed as the global and/or local rotation method(s). In the start-gap wear leveling, an additional gap cell is not utilized during normal operation. That is, there is one fewer logical address per group than there are physical addresses. After a certain number of writes to the group, data is written to the additional gap cell and another cell (e.g., one of the other cells in the group that was previously written to) is not written to. Thus, during each cycle, at least one of the cells of the group is not written to. This redistribution process continues each time a certain number of writes are made to the group, thus distributing writes to, for example, seven logical block addresses to eight physical block addresses to extend a lifespan of the storage device.

In one or more example embodiments, the security refresh may be employed as the global and/or local rotation method(s). In the security refresh, all of the memory cells in a group are assigned a logical block address. During use, logical block addresses of two or more of the memory cells in the group may be swapped corresponding to a change in a key. For example, when the key is changed from 0 to 4, the logical block addresses of cells 0 and 4 may be swapped, the logical block addresses of cells 1 and 5 may be swapped, etc. The key may be changed periodically based on a number of writes to the group.

After the periodic reassignment of the randomized memory address (S30) by, for example, being globally rotated (S31) and/or locally rotated (S32) as described above, a physical location is output (S40). The output physical location may be, for example, a physical block address of a memory cell of a memory device of a storage device, such as a memory cell of one of the memory devices 320-322 of the storage device 300 illustrated in FIG. 3.

According to example embodiments of the present invention, a wear leveling method for a storage device includes a global scrambler to hide the physical block addresses of memory cells to prevent successful or reduce the occurrence of successful malicious code attacks while also providing a global and/or local rotation module which periodically conducts address remapping or reassignment during runtime to provide wear leveling to the storage device. Thus, the storage device can be sufficiently protected from malicious code attacks while also having wear leveling functionality to extend a usable lifetime thereof while using relatively little overhead.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A method of wear leveling for a storage device or a memory device, the method comprising:
   receiving an inputted memory address;
   randomizing the inputted memory address to be a randomized memory address, the randomizing of the inputted memory address comprising swizzling the inputted memory address to be a swizzled memory address and applying an XOR function to the swizzled memory address; and
   periodically reassigning the randomized memory address to be a different memory address.

2. The method of claim 1, wherein the XOR function uses a fixed key.

3. The method of claim 1, wherein the swizzling of the inputted memory address comprises variable address swizzling, fixed address swizzling, or partially variable address swizzling.

4. The method of claim 1, wherein the periodically reassigning of the randomized memory address comprises global or local rotation of the randomized memory address.

5. The method of claim 4, wherein the global or local rotation of the randomized memory address comprises start-gap wear leveling or security refresh.

6. The method of claim 1, wherein the periodically reassigning of the randomized memory address occurs based on a number of writes.

7. A method of wear leveling for a storage device or a memory device comprising a plurality of memory cells, the method comprising:
   receiving a logical block address from a host;
   randomizing the logical block address to be a randomized memory address, the randomizing of the logical block address comprising swizzling the received logical block address and applying an XOR function to the swizzled logical block address; and
   periodically reassigning the randomized memory address to provide a physical block address of one of the memory cells.

8. The method of claim 7, wherein the XOR function uses a fixed key.

9. The method of claim 7, wherein the swizzling of the received logical block address comprises variable address swizzling, fixed address swizzling, or partially variable address swizzling.

10. A storage device comprising:
    a controller; and
    a plurality of memory devices,
    wherein the controller is configured to:
      randomize an inputted memory address, the randomizing of the inputted memory address comprising swizzling the inputted memory address,
      apply an XOR function to the swizzled memory address, and
      periodically reassign the randomized memory address according to a number of writes to the plurality of memory devices after the applying the XOR function to the randomized memory address.

11. The storage device of claim 10, wherein the swizzling of the inputted memory address comprises variable address swizzling, fixed address swizzling, or partially variable address swizzling.

12. The storage device of claim 10, wherein the XOR function uses a fixed key.

13. The storage device of claim 10, wherein the periodically reassigning of the randomized memory address comprises global or local rotation of the randomized memory address.

14. The storage device of claim 13, wherein the global or local rotation of the randomized memory address comprises start-gap wear leveling or security refresh.

* * * * *